Dec. 28, 1926.
J. G. SWAIN
1,612,549
DEMOUNTABLE RIM
Filed Oct. 14, 1924  2 Sheets-Sheet 1
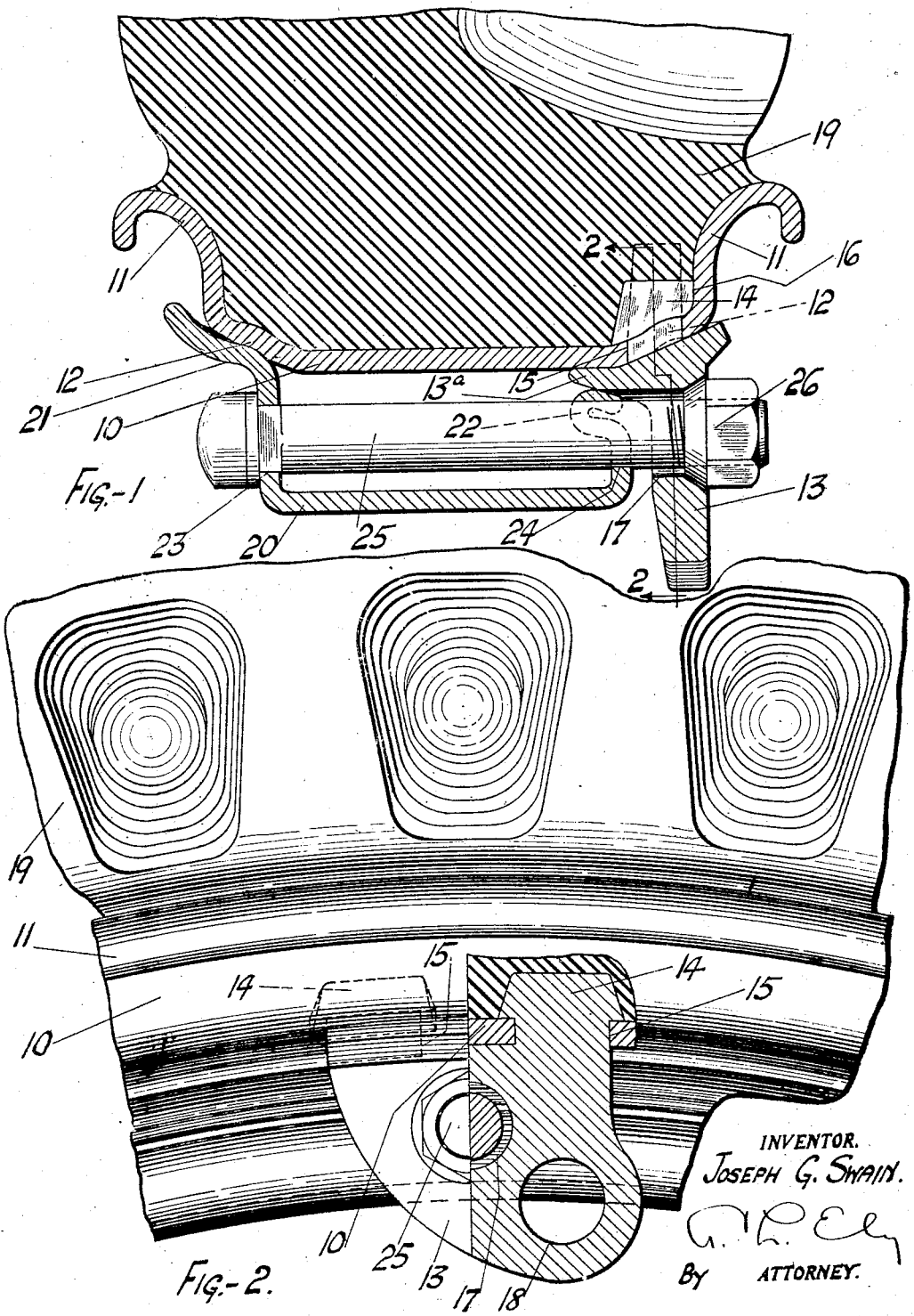
INVENTOR.
JOSEPH G. SWAIN.
By ATTORNEY.

Dec. 28, 1926.
J. G. SWAIN
1,612,549
DEMOUNTABLE RIM
Filed Oct. 14, 1924   2 Sheets-Sheet 2
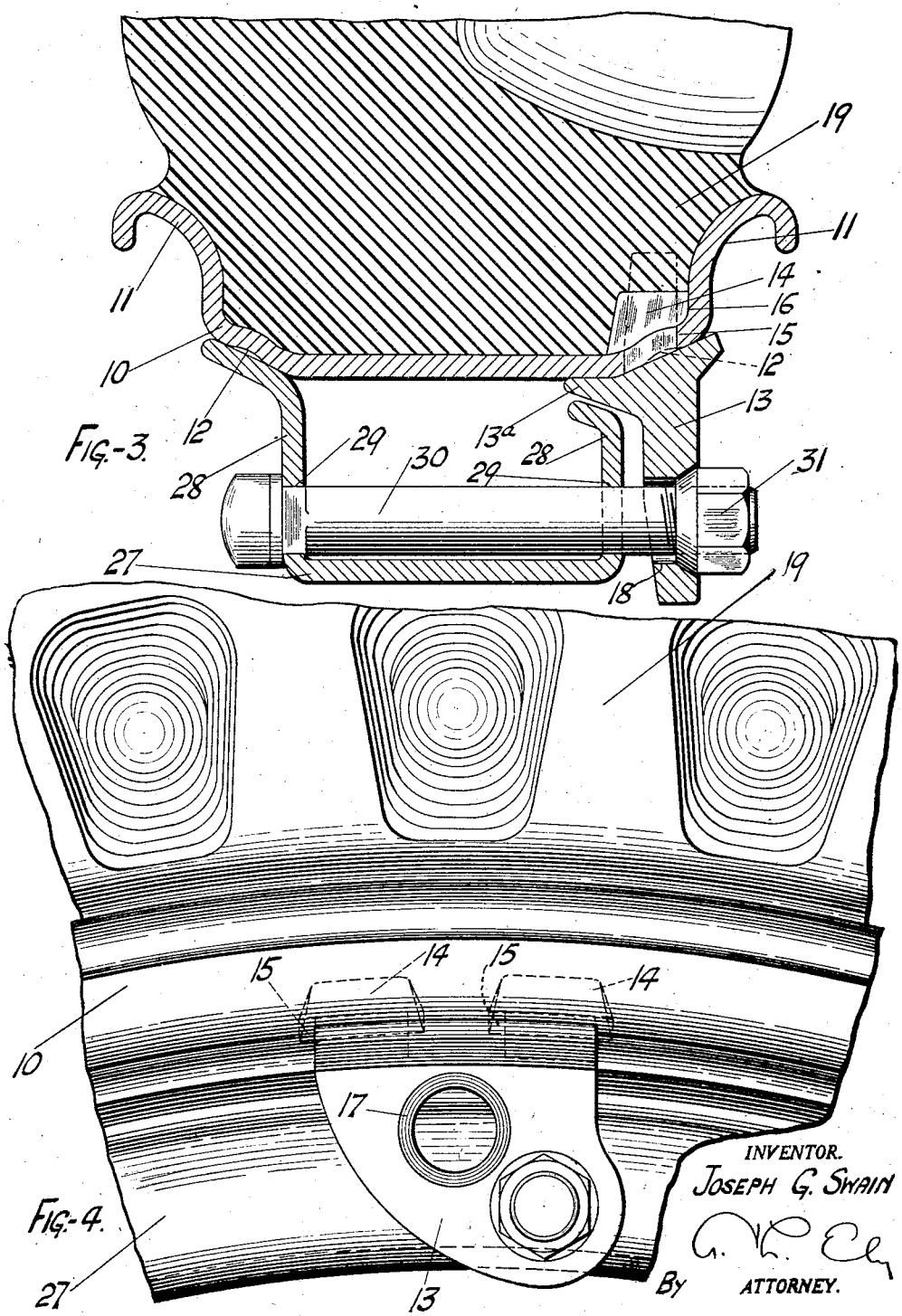
INVENTOR.
JOSEPH G. SWAIN
By ATTORNEY.

Patented Dec. 28, 1926.

1,612,549

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

DEMOUNTABLE RIM.

Application filed October 14, 1924. Serial No. 743,526.

This invention relates to demountable rims and especially to those for use as bases for cushion tires although certain of its features are capable of general application.

One of the objects of the invention is to provide an improved lug for use with demountable rims whereby the rims are adapted to be clamped upon felloes of different types wherein the bolt circle diameters do not correspond.

Another object of the invention is to provide an attached lug for cushion tire bases which will not loosen in use, it being secured against loosening by a projection extending through an aperture in the base, which projection is so riveted over on its outer end as to engage the inner surface of the outer flange on the rim to serve as an anchor for the lug, the riveted over portion of the projection also being adapted to act as interlocking means for securing the tire on the base.

The foregoing and other objects are obtained in the structure described below and illustrated in the accompanying drawings, it being understood that the invention is not limited to the specific structure described and shown.

Of the accompanying drawings:

Figure 1 is a transverse section through a cushion tire formed on the rim of the invention which is shown mounted on a felloe of one type;

Figure 2 is an outer side elevation thereof, partly in section on line 2—2 of Figure 1;

Figure 3 is a view similar to Figure 1 illustrating the rim of the invention on another type of felloe; and Figure 4 is an outer side elevation thereof.

In the accompanying drawings, 10 represents a rim base for cushion tires. The rim is formed with radial flanges 11, 11, and slightly circumferentially troughed portions 12, 12, on both sides of its inner periphery. Secured to the rim 10 are a plurality of lugs indicated at 13 spaced circumferentially about the rim. Each lug 13 is secured to the rim by projections 14, 14, formed thereon, orginally in the shape indicated in Figures 1 and 3 by dotted lines, so that the projections 14, 14, may be inserted through apertures 15, 15, formed in the outer circumferentially troughed portion 12. The projections 14 are riveted over as indicated in full lines in the drawings so that they each engage the inner face of outer flange 11 as at 16, whereby the flange 11 serves as an anchorage for the lugs 13. Each lug 13 is provided with a plurality of, in this instance two, bolt holes 17 and 18 for a purpose later to be explained. A cushion tire 19 is shown vulcanized onto rim 10 whereby the portions 14 serve to interlock the tire and rim against separation.

In Figures 1 and 2 the rim 10 is shown mounted on one type of felloe 20 which has an inner radial flange 21 on which the inner trough-shaped portion 12 of rim 10 is adapted to seat and which has an outer radial flange 22 on which an inwardly directed portion 13ª on each lug 13 is adapted to seat. It is to be noted that portion 13ª also serves as means to prevent loosening of the lug 13, it having anchorage on the inner side of rim 10. Bolt holes 23 and 24 are formed in flanges 21 and 22 in alignment so as to receive bolt 25. Aperture 17 in lug 13 is adapted to align with bolt holes 23 and 24 so as to receive bolt 25. A nut 26 is threaded onto each bolt 25 into engagement with each lug 13 to clamp the rim onto the felloe.

In Figures 3 and 4, there is shown a felloe 27 having radial flanges 28, 28, on which the rim 10 is adapted to seat. The flanges 28, 28, have aligned apertures 29, 29, therein for receiving a bolt 30. Aperture 18 in lug 13 is adapted to align with apertures 29 to receive bolt 30 and a nut 31 is threaded onto the end of bolt 30 to engage lug 13 so as to clamp rim 10 on the felloe.

In the type of felloe shown in Figures 3 and 4, the circle of bolt-holes is of less diameter than that of the felloe in Figures 1 and 2; accordingly the form of clamp shown is such that the rim 10 is interchangeable on the two types of felloes. This feature, as is apparent, is capable of being applied in rim structures for pneumatic tires, as well as cushion tires, and also may be employed to fit rims to a number of different types of felloes, more than two, if desired.

Modifications of the invention may be resorted to without departing from the spirit thereof or the scope of the appended claims.

What is claimed is:

1. A device of the class described comprising, in combination, a rim and a clamping lug attached thereto, said lug being provided with a plurality of bolt apertures whereby the rim is adapted to be mounted on felloes having different bolt circle diameters.

2. A rim base for cushion tires having an aperture adjacent its outer side, a lug having a projection extending through said aperture, said lug being adapted to demountably secure the base on a felloe, and said projection being so riveted over the aperture as to provide means for interlocking the rim with a tire vulcanized thereon.

JOSEPH G. SWAIN